United States Patent
Wood et al.

(10) Patent No.: US 10,690,865 B2
(45) Date of Patent: Jun. 23, 2020

(54) SPACE ACTIVE OPTICAL CABLE

(71) Applicant: LOCKHEED MARTIN CORPORATION, Bethesda, MD (US)

(72) Inventors: Lance A. Wood, Winter Park, CO (US); Harsha Krishna Kopuru, Parker, CO (US); Rebekah Jean Mitchell, Littleton, CO (US); Jason Paul Smith, Sartell, MN (US); Timothy John Wasland, Little Falls, MN (US)

(73) Assignee: AIRBORN INC., Georgetown, TX (US)

( * ) Notice: Subject to any disclaimer, the term of this patent is extended or adjusted under 35 U.S.C. 154(b) by 0 days.

(21) Appl. No.: 16/581,560

(22) Filed: Sep. 24, 2019

(65) Prior Publication Data
US 2020/0018913 A1    Jan. 16, 2020

Related U.S. Application Data

(63) Continuation of application No. 15/150,254, filed on May 9, 2016, now abandoned.
(Continued)

(51) Int. Cl.
*G02B 6/42* (2006.01)
*H04B 10/40* (2013.01)
*G02B 6/44* (2006.01)

(52) U.S. Cl.
CPC ......... *G02B 6/4246* (2013.01); *G02B 6/4206* (2013.01); *G02B 6/428* (2013.01);
(Continued)

(58) Field of Classification Search
None
See application file for complete search history.

(56) References Cited

U.S. PATENT DOCUMENTS 7,484,899 B2   2/2009   Chan
8,903,246 B2   12/2014  Wieland
(Continued)

OTHER PUBLICATIONS

Extended European Search Report from European Patent Application No. 16793406.6, dated Dec. 20, 2018, 7 pages.
(Continued)

*Primary Examiner* — Chad H Smith
(74) *Attorney, Agent, or Firm* — Morgan, Lewis & Bockius LLP

(57) ABSTRACT

A space active optical cable (SAOC) includes a cable including one or more optical fibers, and two or more electrical transceivers on opposing ends of the cable and interconnected by the cable. Each of the electrical transceivers includes an enclosure that encloses one or more light sources, one or more light detectors, and control electronics. Also included in the enclosure are a coupling medium to couple light into and out of the one or more optical fibers. The coupling medium can be reflecting surface or an on-axis mount. The enclosure provides a suitable heat propagation and electromagnetic interference (EMI) shielding, and the cable and the two or more electrical transceivers are radiation resistant. SAOC features optionally support a health check algorithm that allows trending optical performance in the absence of an optical connector and a potential surface treatment to increase nominally low emissivity of an EMI conductive surface.

20 Claims, 10 Drawing Sheets

Related U.S. Application Data

(60) Provisional application No. 62/161,767, filed on May 14, 2015, provisional application No. 62/206,806, filed on Aug. 18, 2015.

(52) U.S. Cl.
CPC ......... *G02B 6/4214* (2013.01); *G02B 6/4267* (2013.01); *G02B 6/4277* (2013.01); *G02B 6/4284* (2013.01); *G02B 6/4286* (2013.01); *G02B 6/4415* (2013.01); *H04B 10/40* (2013.01)

(56) References Cited

U.S. PATENT DOCUMENTS

| | | |
|---|---|---|
| 9,321,638 B2 | 4/2016 | Cortes-Concepcion |
| 2005/0018817 A1 | 1/2005 | Oettinger |
| 2010/0251775 A1 | 10/2010 | Regnier |
| 2011/0268390 A1 | 11/2011 | Yi |
| 2012/0191997 A1* | 7/2012 | Miller ............... G06F 1/32 |
| | | 713/323 |
| 2013/0236188 A1 | 9/2013 | Hung et al. |
| 2014/0186023 A1 | 7/2014 | Louderback |
| 2015/0050015 A1 | 2/2015 | Levy et al. |
| 2015/0323748 A1 | 11/2015 | Contag |

OTHER PUBLICATIONS

Vorobyeva, et al., "Multifunctional surfaces produced by femtosecond laser pulses," Journal of Applied Physics 117, 033103 (2015).

\* cited by examiner

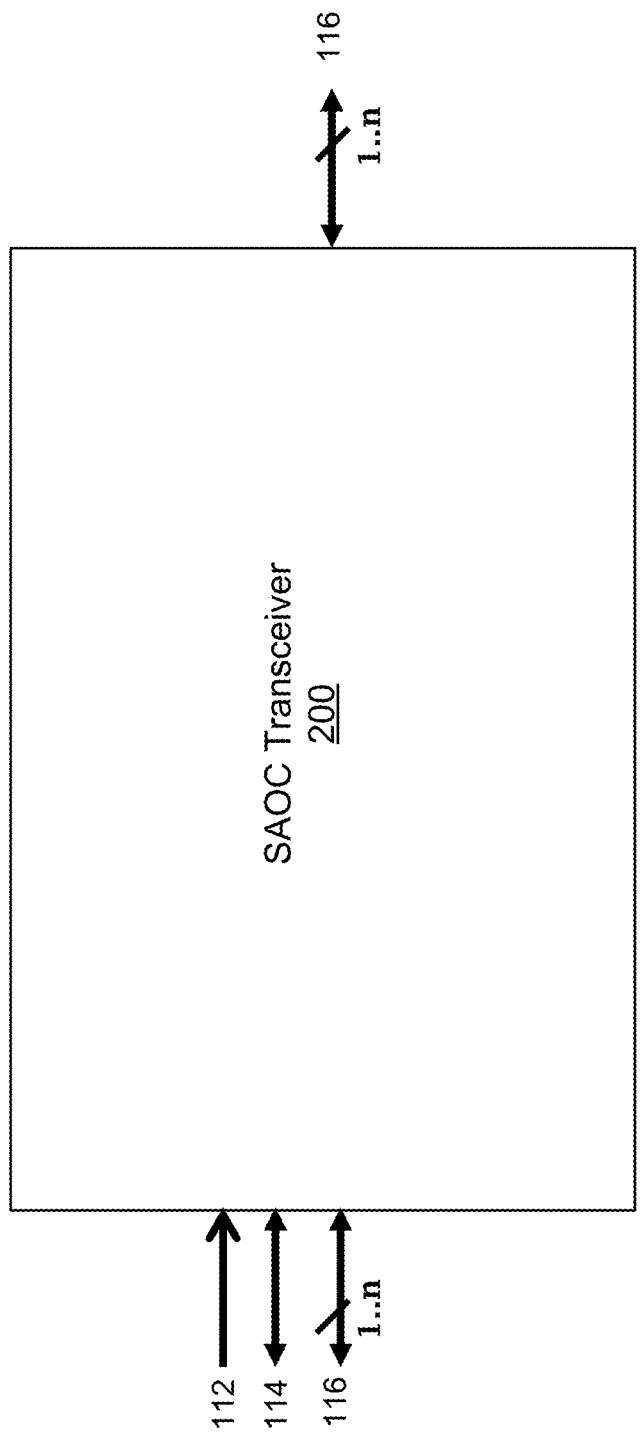

SPACE ACTIVE OPTICAL CABLE

CROSS-REFERENCE TO RELATED APPLICATIONS

This application is continuation of the U.S. patent application Ser. No. 15/150,254, filed May 9, 2016 that claims the benefit of priority under 35 U.S.C. § 119 from U.S. Provisional Patent Application No. 62/161,767 filed May 14, 2015 and U.S. Provisional Patent Application No. 62/206,806 filed Aug. 18, 2015, all of which are incorporated herein by reference in their entirety.

STATEMENT REGARDING FEDERALLY SPONSORED RESEARCH OR DEVELOPMENT

This invention was made with government support under contract number FA8620-11-C-3142 awarded by the United States Government. The government has certain rights in this invention.

FIELD OF THE INVENTION

The present invention generally relates to electro-optics, and more particularly, to a space active optical cable, optionally with a high emissivity conductive surface, high coupling efficiency, and a custom health check algorithm for trending optical performance.

BACKGROUND

Space applications such as spacecraft communication applications require high-speed data links to communicate digital information. At high data rates, fiber optic links are more attractive than copper links, due to bandwidth performance limitations of copper links over long lengths. Optical fiber is light weight and is inherently immune to electromagnetic interference (EMI). Traditional space based fiber optic links are printed circuit board (PCB) mounted transceivers, requiring board space and optical connectors at the box wall. Multiple programs have experienced significant issues with fiber optic connectors, such as, a space program had impacts totaling millions of dollars from optical connector non-conformances, and an aircraft program experienced significantly delayed delivery based on optical connector issues. Even without issues, optical connectors may need extra effort in the form of inspection, cleaning, and special testing not needed for an electrical connectors.

An active optical cable (AOC) eliminates optical connectors, having electrical only interfaces, while maintaining the advantages of fiber optic data links and reducing internal PCB impacts by mounting the optical transceiver in a connector backshell. An existing AOC has low optical coupling efficiency, when using flat reflective surface. The optical source divergence, geometry to the fiber, and surface roughness allow significant light to not be coupled into the fiber. The space active optical cable is designed and processed for space environments, radiation and vacuum, as well as for high reliability and extreme temperatures.

SUMMARY

In some aspects, a space active optical cable (SAOC) includes a cable including one or more optical fibers, and two or more electrical transceivers on opposing ends of the cable and interconnected by the cable. Each of the electrical transceivers includes an enclosure that encloses one or more light sources, one or more light detectors, and control electronics. Also included in the enclosure are a reflecting surface or on-axis alignment mount to couple light into optical fibers. The enclosure provides suitable means of heat propagation and electromagnetic interference (EMI) shielding. The cable and the two or more electrical transceivers are radiation resistant and vacuum compatible.

In other aspects, a method for providing an SAOC includes providing a cable comprising one or more optical fibers and a first electrical transceiver for coupling to a first end of the cable. The first electrical transceiver is enclosed in a first enclosure enclosing a light detector and a reflecting surface or on-configured to couple light out of one or more fiber onto one or more detectors. The first enclosure is designed and/or processed to provide a predetermined path for heat propagation/conduction, EMI specification compliance and to be made of radiation resistant components. The cable and the first electrical transceiver are built to be radiation resistant and vacuum compatible.

In yet other aspects, a method of providing an SAOC may include processing enclosure with a nickel layer over surfaces of the enclosure and charring the surfaces of the enclosure. The charring is performed by using short duration, even femto-second, laser pulses, while the power level of the laser pulse is increased sharply to a predetermined-level and reduced steeply to avoid ablating the nickel layer. This leaves the surface conductive, providing an EMI Faraday cage, while increasing the absorption/emissivity of the surface. The enclosure is used to enclose a first electrical transceiver end of the SAOC. The first electrical transceiver includes a first optical coupler formed by a first curved reflector surface and a light source and detector. A second electrical transceiver for coupling to the opposite end of the SAOC is enclosed in the enclosure similarly. Thus, the SAOC is bidirectional, both transmitting and receiving at each end, simultaneously.

The health check algorithm aspect of the SAOC is a unique way to trend optical performance in the absence of an optical connector. The operating drive current is adjusted to an established value where performance is very sensitive to optical attenuation. By repeating test in this configuration, Bit Error Rate (BER) and Receiver Signal Strength Indicator (RSSI) can be trended indicating a change in optical performance. Health check may readily apply to most any AOC, not just the SAOC. The foregoing has outlined rather broadly the features of the present disclosure in order that the detailed description that follows can be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein:

FIGS. 2A through 2C are diagrams illustrating an example of a space AOC (SAOC), according to certain aspects.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed to an active optical cable, in part, to methods and configuration for providing a space active optical cable (SAOC) that satisfies space ratings as discussed in more details herein. The subject technology significantly improves optical couplings and provides enclosures with a permanent finish that satisfy multiple requirements such as emissivity and EMI performance. The improvement in optical coupling is achieved without applying tape or paint for emissivity enhancement. The subject technology allows laser charred finishing that stops at the initial charred stage (e.g., change in absorption), which increases surface emissivity, while maintaining properties such as conductivity of the base material (e.g., nickel).

Figure 1A:
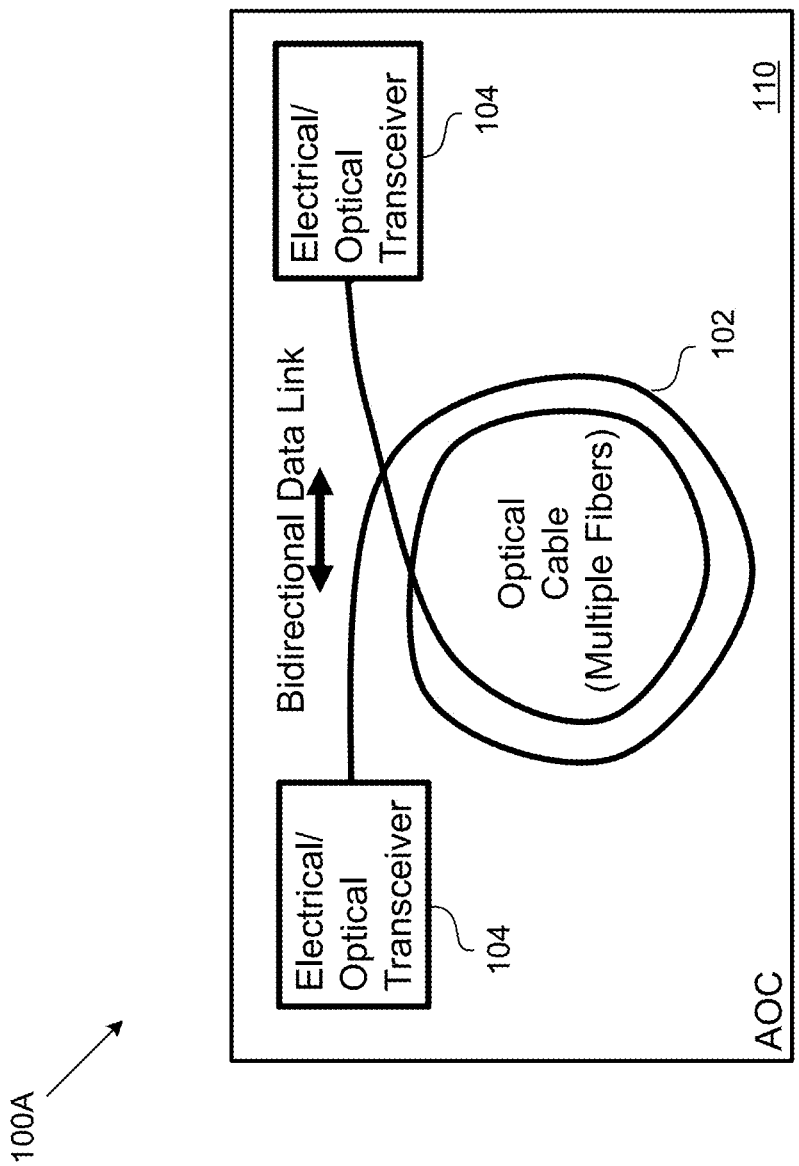
FIGS. 1A and 1B are a structural diagram and a corresponding functional diagram of an example of an active optical cable (AOC), according to certain aspects.
Figure 1B:
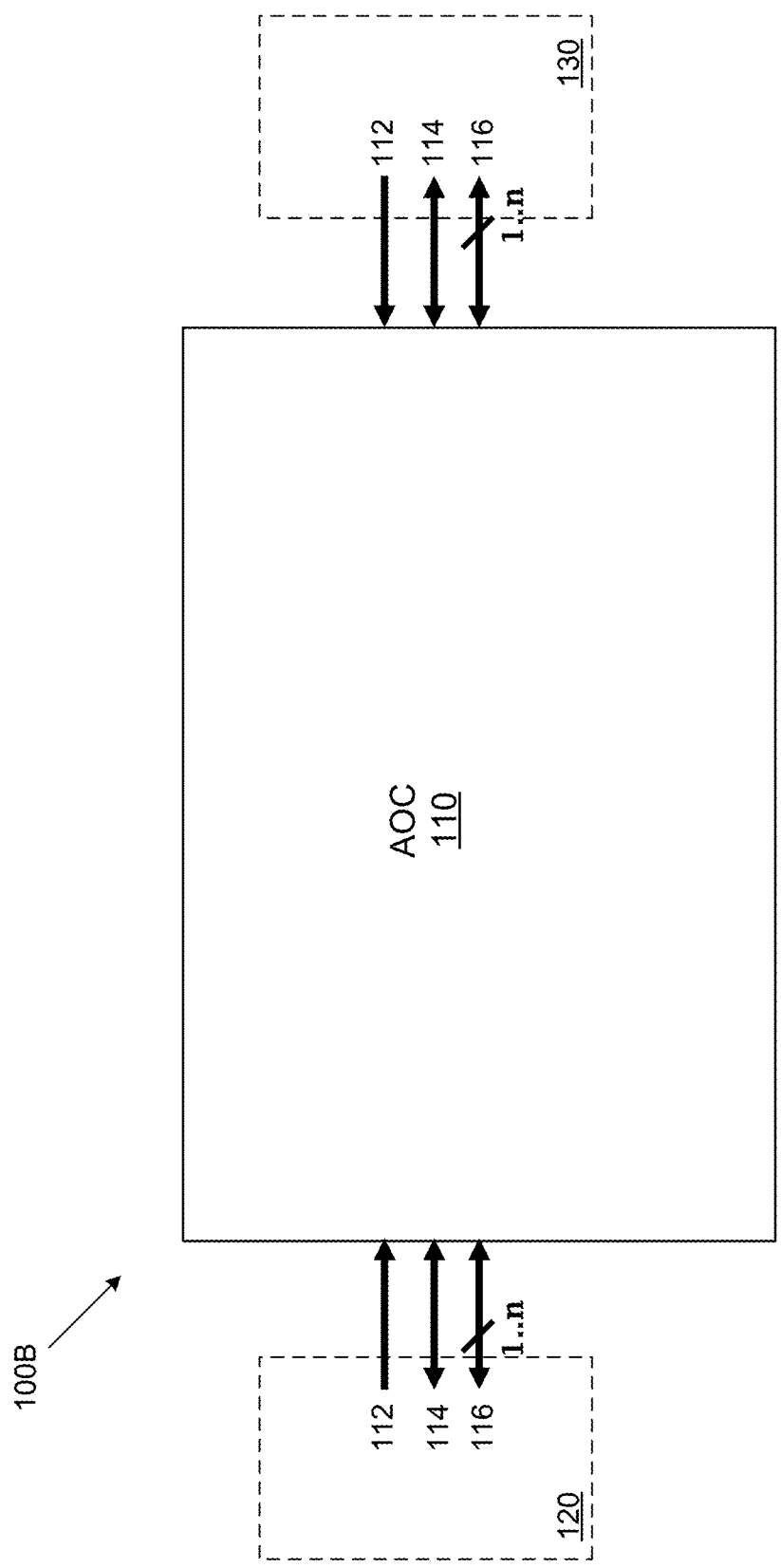

FIGS. 1A and 1B are a structural diagram 100A and a corresponding functional diagram 100B of an example of an active optical cable (AOC) 110, according to certain aspects of the subject technology. The AOC 110 includes a cable (e.g., an optical cable) 102 interconnecting electrical transceivers 104 coupled to two ends of the cable 102. The optical cable 102 includes one or multiple optical fibers, each of which can be used for transmission of data to or reception of data from an electrical transceiver (e.g., 104). Each of the electrical transceivers 104 can receive an electrical signal from an electrical interface, generate an optical signal based on the electrical signal, and provide the generated optical signal to the cable 102. Each of the electrical transceivers 104 can simultaneously receive an optical signal from the cable 102 and generate an electrical signal to be received by the same electrical interface or another electrical interface.

In one or more aspects, photonics and support electronics used in electrical transceivers 104 are small and low-power semiconductor devices, such that they can be located in an electrical connector back-shell. As explained above, the electrical transceivers 104, electrical data is first converted to an optical signal in the back-shell, transmitted over optical fiber, and then converted back to electrical data at a destination back-shell. In some embodiments, box-to-box, point-to-point, optical links are accomplished with electrical only connectors to the outside of the box. Bidirectional links may use a dedicated fiber for each direction, or may be on a single fiber using an optical circulator approach for achieving bidirectionality.

In the functional diagram 100B, the AOC 110 is shown to be operable to receive power from any of the electrical interfaces (e.g., 120 and 130) that may be connected to electrical transceivers 104 through one or both of the power line 112. In some aspects, at least a portion of the received electrical power over the power lines 112 is consumed by the internal circuitry of the electrical transceivers 104. The control lines 114 may be used by the AOC 100 to communicate control signals with the electrical interfaces 120 and 130 connected to electrical transceivers 104. The control signals are electrical signals that, for example, can be utilized for controlling automatic algorithms that are responsible for performance management of the AOC 100. The data communication between the electrical transceivers 104 and other devices and/or systems connected to the AOC 110 through the electrical interfaces 120 and 130 is carried over the data line(s) 116 (e.g., lines 1-$n$, for n bits of data). Mechanical interfaces are also used to mechanically couple the AOC 110 to the other systems and/or devices. The mechanical interfaces are controlled for their thermal conductivity, emissivity and electromagnetic interference (EMI) qualities to make sure that a reliable thermal path and an EMI shielding are provided.

Figure 2B:
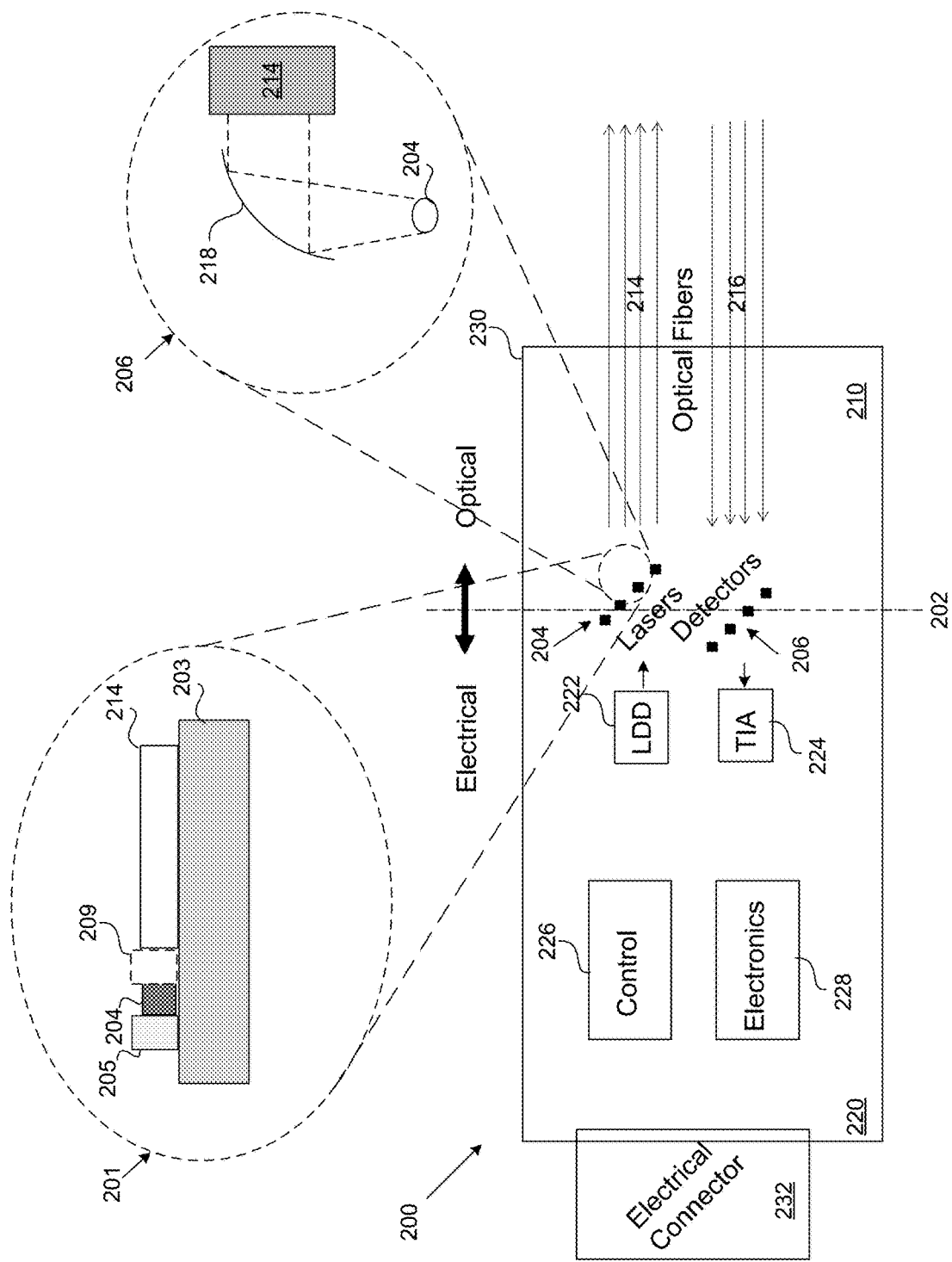
Figure 2C:
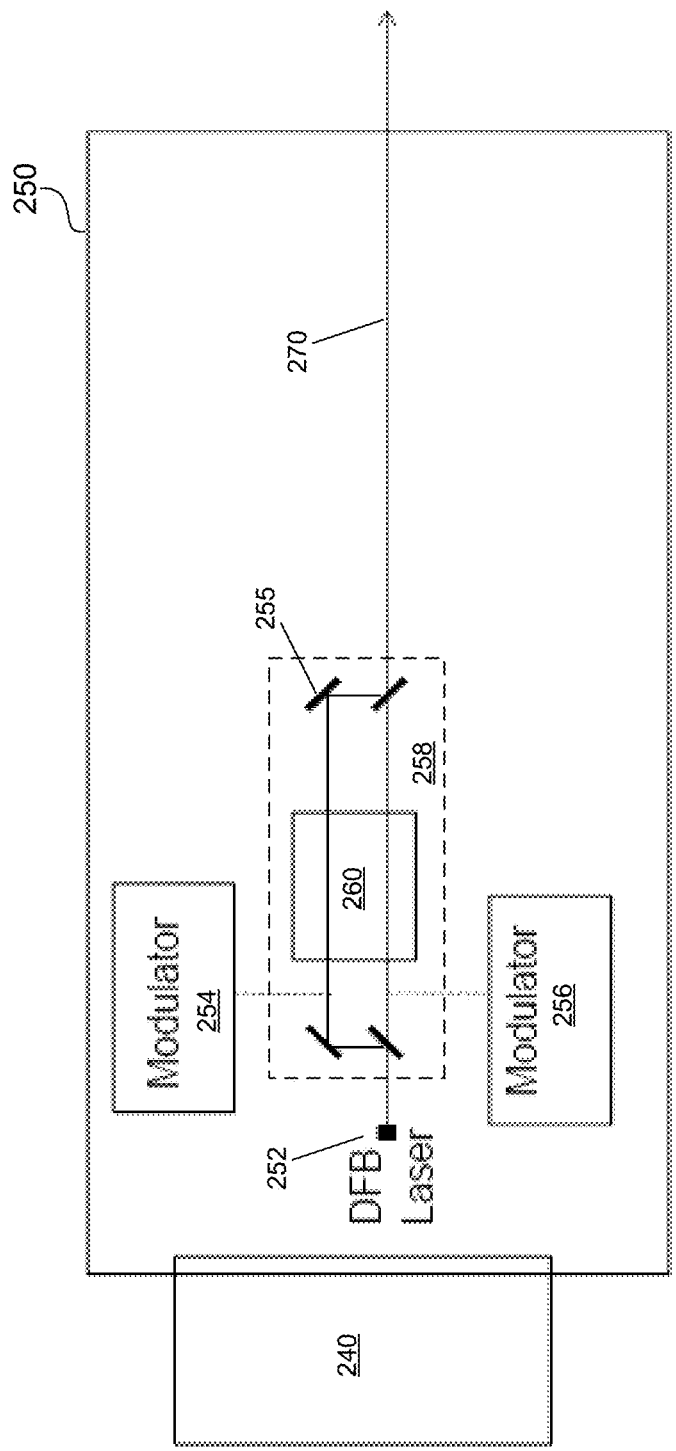

FIGS. 2A through 2C are diagrams illustrating an example of a space AOC (SAOC) transceiver 200, according to certain aspects of the subject technology. The SAOC transceiver 200 is a portion of a SAOC cable, which has a similar general structure as the AOC 110 of FIG. 1A, except that all components, materials, and processes involved in the production and maintenance of the components and materials are space rated, as described herein. Each SAOC cable has two or more of the SAOC transceiver 200. The SAOC transceiver 200 can receive power, control signals, and data through the power line 112, control line 114, and the data line(s) 116, respectively. In one or more aspects, the electrical power received through the power line 112 is used for internal consumption by the electrical circuitry of the SAOC transceiver 200. The control signals are electrical signals received over the control line 114 and may be used to control the functionality and performance of the SAOC transceiver 200. The data received via the data line(s) 116 are electrical signals which are converted to optical signals by the SAOC transceiver 200, as further discussed below.

In one or more aspect, the SAOC transceiver 200 as shown in FIG. 2B, includes an optical portion 210 and an electrical portion 220. The SAOC transceiver 200 is enclosed in an enclosure 230 and is coupled to an electrical interface through an electrical connector 232 (e.g., a D-sub connector). The electrical interface may be an interface of a system and/or device connected to the SAOC transceiver 200 through the electrical connector 232. The electrical portion 220 includes a laser diode driver (LDD) 222, a trans-impedance amplifier (TIA) 224, a control circuit 226, and an electronic circuit 228. One or more lasers 204 and one or more light detectors 206 may be considered as converters between the electrical portion 220 and the optical portion 210 and are electrically coupled to the portion 220, while being optically coupled to the optical portion 210. The optical portion 210 includes optical components including optical couplers and/or lenses (e.g., a reflector 218) that optically couple the lasers 204 and light detectors 206 to the optical fibers (e.g., 216) of a cable (e.g., 102 of FIG. 1A) connected to the SAOC transceiver 200. The optical components for the optical coupling of a laser 204 to an optical fiber 214 are shown in a blown-up view 206.

In some implementations, the optical coupling of the laser 204 to the optical fiber 214 can be performed using an on-axis mount, as shown in a blown-up view 201. The components of the on-axis mount include a base submount 203, a vertical submount 205, the laser 204 (e.g., a VCSEL), the optical fiber 214, and, optionally, a transparent mounting block 209. The base submount 203 may be made, for example, of a semiconductor material such as silicon or a radiation hard and vacuum compatible printed circuit board (PCB) material. The vertical submount 205 may be made, for example, of alumina (Al2O3) or a semiconductor material such as silicon that can support electrical traces from the laser 204 to the base submount 203. The transparent mounting block 209 is made, for example, of sapphire. The optical fiber 214 is a multi-mode fiber, although or a single-mode optical fiber can also be used instead.

In some implementations, as shown in FIG. 2B, the laser 204 is mounted on the vertical submount, and the transparent mounting block 209 is not needed. In some aspects, the laser 204 may be mounted on the base submount 203, in which case the vertical mount is not used and the optical fiber 214 is mounted on a V groove created on the base submount 203 to facilitate alignment of the laser 204 with the optical fiber 207. In some other aspects, the vertical mount is not used and the laser 204 is mounted on the transparent mounting block 209, which fills the gap between the laser 204 and the optical fiber 214.

In one or more aspects, the optical coupler 218 used in the optical portion 210 is improved for achieving high optical coupling efficiency, for example, by using a first surface reflection curved instead of flat, which is critical angle dependent. In addition, the optical adhesive surface of the reflector 218 could be coated with a reflective material such as Au or Ag, deposition of which may further provide protection for the exposed surface. In some aspects, the surface of the reflector 218, as shown, can be further shaped or lensed and made smoother to improve coupling efficiency. The reflector 218 focuses the light from laser 204 into the fiber 214. In some implementations, an actively aligned separate mirror could be introduced and be held with the optical adhesive currently used. The disclosed optical coupling can result in significantly higher coupling efficiency. For example, using a direct alignment mount on axis with the fiber improvement in coupling efficiency of up to 70% can be achieved.

In some aspects, the light detectors 206 are photodiodes properly biased to be able to detect light photons received from respective optical fibers 216 coupled to the light detectors 206. The light detectors 206 can generate current signals in response to the detection of light photons. The current signal generated by the light detectors 206 are amplified by the TIA 224, which generates corresponding voltage signals. The voltage signals generated by the TIA 224 are processed by the electronic circuit 228 and provided to the electrical connector 232 for transmission through the electrical interface of the system and/or device connected to the SAOC transceiver 200. The light detectors are coupled to fibers 216 with high efficiency couplers of the subject technology similar to the reflector 218. In one or more aspects, the light detectors 206 are implemented using photo-diodes, such as semiconductor photodiodes.

In some aspects, the lasers 204 are vertical cavity surface-emitting laser (VCSEL) type lasers which are space rated. A major advantage of VCSELs over edge-emitter lasers is ease of coupling. VCSELs have a circular surface output that can be coupled without the need of an additional lens to circularize to output light. The edge-emitting lasers may utilize a lens to help circularize the beam, have higher flux density that often requires angled coupling to avoid back reflection. Edge-emitting lasers have much higher drive current requiring more power than VCSELs. VCSELs may also be easily addressed as an array by an array of lenses or fibers. The VCSELs do not have mm cavity lengths and high flux density, as the edge-emitting lasers have.

The lasers 204 may include an array of VCSELs that are coupled to and driven by the LDD 222, which is a known circuit. The LDD 222 is driven by signals from the electronic circuit 218 and/or the control circuit 216. In some aspects, the electronic circuit 228 receives data from data lines 116 of FIG. 2A and performs suitable processing on the received data before providing the data in the form of processed electrical signals to the LDD 222. The lasers 204 generate optical light (signals) for transmission over the optical fibers 214 of a cable (e.g., 102 of FIG. 1A) connected to the SAOC transceiver 200. In one or more aspects, the control circuit 226 receives control signals from control lines 114 of FIG. 2A and based on the received control signals exerts control over the electronic circuit 228.

The SAOC 200 is enclosed in the enclosure 230 with good heat-sink and EMI protection using gaskets and communicates command, control, and telemetry signals via a serial interface such as the electrical connector 232. Space qualification challenges may be met by leveraging space rated components such as qualified impedance-controlled electrical connectors, radiation resistant fibers and cables, radiation hard custom electronics, high reliability and high temperature VCSELs, and the like. For example, the SAOC 200 may be prepared for use in radiation and vacuum environment for high-reliability space applications and may include radiation resistant fibers (e.g., resistant to gamma rays) and radiation resistant electronics (e.g., resistant to ionizing radiation, protons, and heavy ions), and space rated parts, material, and processes. The space rating may include making sure that the parts and material are qualified for space application with repeatable and reliable test results such having as low outgassing. Further, the SAOC 200 may include automatic algorithms (e.g., routines) for autonomous device maintenance and performance management in space environments. The routines may be implemented in firmware and be performed by hardware, for example, one or more processors (e.g., microcontrollers such as control circuit 226 of FIG. 2B). In one or more implementations, the firmware and the processors is part of the electronic circuit 228 and/or the control circuit 226.

In some implementations, as part of the space rating qualifications ruggedization may be performed to survive launch vibration and/or shock and temperature cycling, using a space qualified electrical connector (e.g., 232). In one or more aspects, a corresponding mechanical interface is designed for vacuum pressure compatible thermal management and EMI performance. For example, a Faraday cage may be used with conductive heat transfer. As part of the space rating, the material and components used in the SAOC 200 are selected to be operable in extended operating temperature (e.g., ~100° C. at SAOC interface) and satisfy high reliability requirements of a multi-year mission use.

In one or more implementations, the SAOC 200 may also serve as a platform 250 for RF-over-fiber, as shown FIG. 2C, or other connector back-shell based applications. In some aspects, the platform 250 of the subject technology eliminates the need for optical connectors for space applications. This is especially attractive because space applications do not have multiple bulkheads as, for example, a ship might have. The platform 250 provides a readily usable solution for high-speed point-to-point data links. In one or more aspects, the platform 250 is coupled through the interface 240 (e.g., a serial interface) to an electrical interface of another devices or system connected to the platform 250. The interface 240, similar to the electrical connector 232 of FIG. 2B can receive power and communicate control and data signals. The platform 250 includes a light source 252, local oscillator (LO) modulator 254, a radio-frequency (RF) modulator 256, and a light processor 258. The light source 252 includes, for example, a distributed feedback (DFB) laser, which is a type of laser diode, quantum cascade laser, or optical fiber laser with an active region that is periodically structured as a diffraction grating. The light source 252 generates an optical carrier signal which can be modulated with LO and RF signals, as desired. The LO modulator 254 receives an LO electrical signal as an input and modulates the optical carrier signal with the LO signal. The RF modulator 256 receives an RF electrical signal as an input and modulates the optical carrier signal with the RF signal.

The light processor 258 includes a filter and lock-diode unit 260 and mirrors 255. The light processor 258 receives laser light from the DFB laser 252 and LO and RF modulated lights from the LO modulator 254 and RF modulator 256 and provides a heterodyne output light signal to an optical fiber 270 (e.g., a single-mode optical fiber). The filter and lock diode unit 260 includes a filter component that can filter the RF signal as desired and a wave locking laser diode that can lock the modulated laser light to the filter. In one or more aspects, the filter component is a multi-layer optical filter such as a wave-length-division-multiplexing (WAD) filter. The platform 250 may further include other RF photonics circuits including a low-noise amplifier (LNA) and one or more optical switches for routing and redundancy purposes.

Figure 3A:
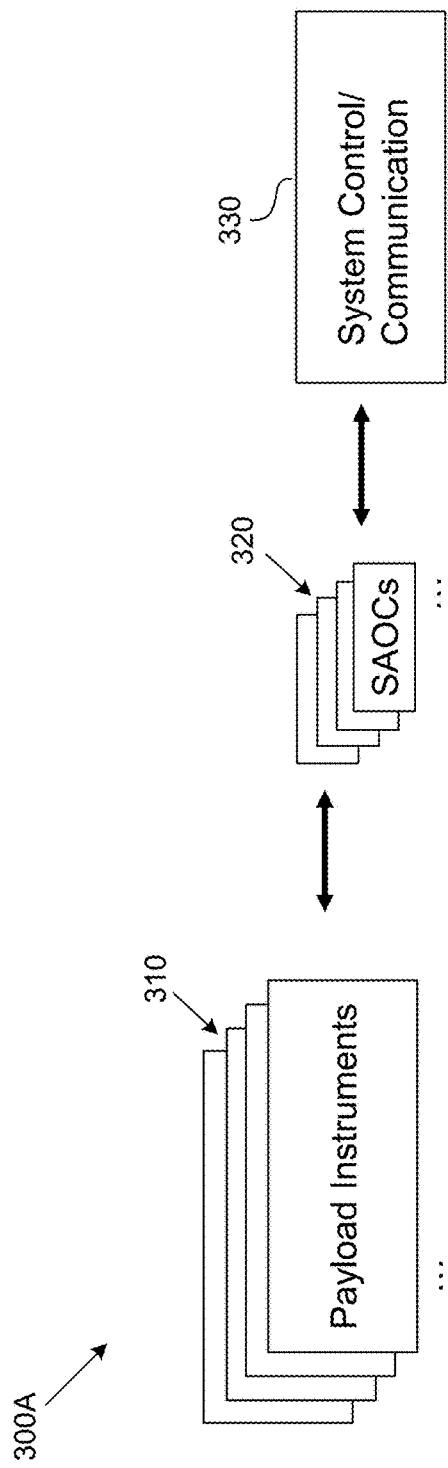
FIGS. 3A and 3B are diagrams illustrating examples of system applications of a SAOC, according to certain aspects.
Figure 3B:
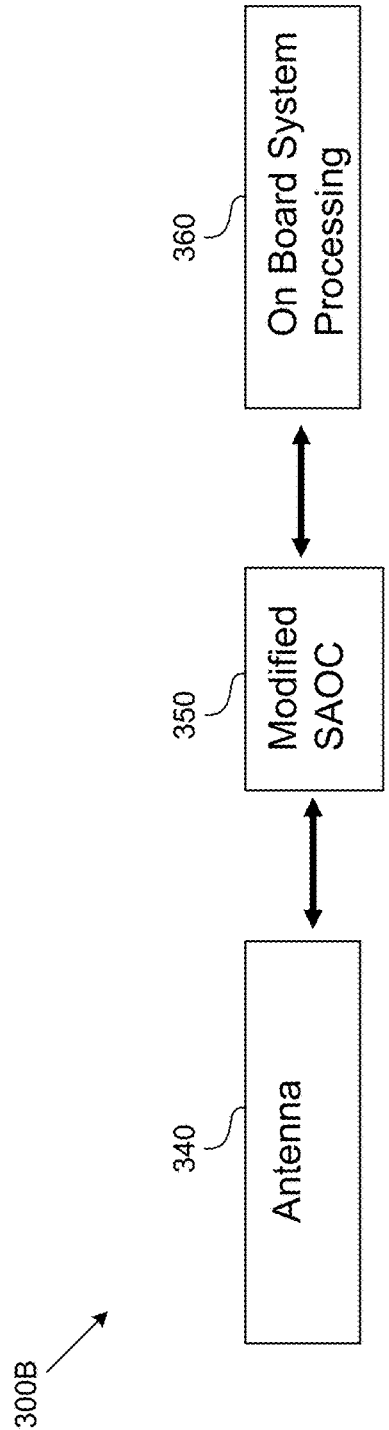

FIGS. 3A and 3B are diagrams illustrating examples of system applications 300A and 300B of SAOC 320, according to certain aspects of the subject technology. As shown in FIG. 3A, one or more SAOC 320 similar to SAOC 200 of FIG. 2B, may be used in digital data transfer at high date rates with strict mass and power limitations that demand an optical solution, for example, a fiber-based sensor application. In some aspects, the SAOC 320 facilitates communication between payload instruments 310 and a control and communication system 330. Examples of the payload instruments include GPS communication devices, earth sensor and imaging devices, and space sensor and imaging devices. Other applications of the SAOC include analog RF over fiber applications. In an analog RF over fiber application, as shown in FIG. 3B, one or more RF antennas can be coupled to an on board system processing 360 using a modified SAOC 350 such as the SAOC 250 of FIG. 2C. The on board system processing 360 may, for example, include RF demodulator and base-band circuitry to further process a heterodyne signal generated by the modified SAOC 350.

Figure 4:
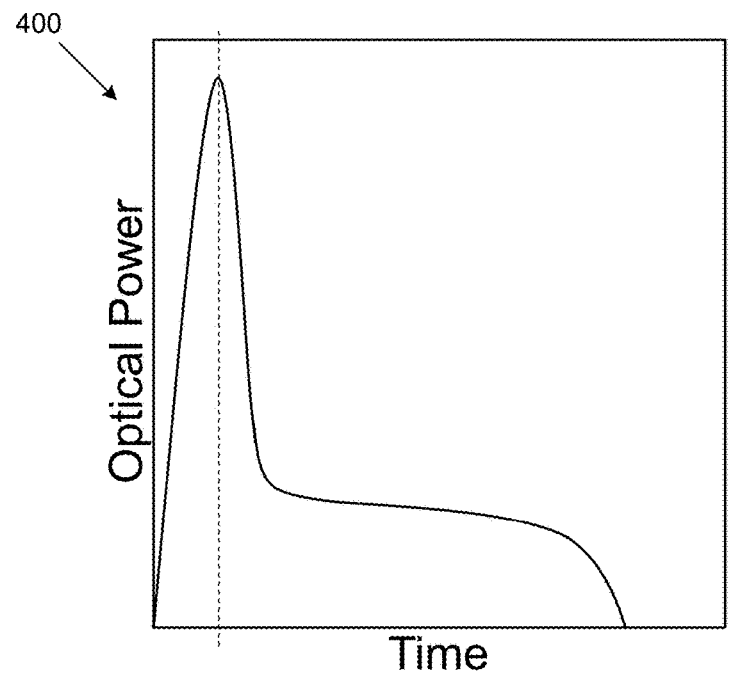
FIG. 4 is a diagram illustrating an example of a laser pulse profile used in charring an enclosure of a SAOC, according to certain aspects.

FIG. 4 is a diagram illustrating an example of a laser pulse profile 400 used in charring the enclosure of a SAOC, according to certain aspects of the subject technology. Space hardware including SAOC (e.g., 200 of FIG. 2B), as explained above, have to satisfy EMI requirements and emissivity requirements simultaneously. This can become challenging as the material properties often conflict. For example, nickel is one of the most desired materials for EMI performance, but has a smooth reflective surface, while high emissivity requires the use of a material with a dark or opaque finish. Space-rated thermal paints are often used to paint nickel black to achieve both requirements. Paints, however, do not adhere well to nickel and have proven to flake off frequently during handling of other managed service provider (MSP) hardware, creating foreign object damage (FOD). The paint option is not suitable for the SAOC because paint flakes off and as a result exposes the surface underneath. This counters the original intent of providing a uniform thermally conductive surface that enhances heat radiation.

Another available option is to use Kapton tape applied to the external surface of the hardware during vehicle assembly. The Kapton tape can raise other concerns, for example, lengthening the assembly process and changing the mass and dimensions of the hardware. It also impedes remove and replace (RandR) and raises concerns of adverse residues and appearance of the hardware.

The subject technology improves surface emissivity, for example, of the SAOC enclosure (e.g., 230 of FIG. 2B) by using laser charring using laser pulse profiles with controlled results. In some aspects, laser charring can be performed by applying high optical power laser profile 400 of FIG. 4 to the subject surface (e.g., nickel surface) to greatly increase absorption, and then a steep reduction in power to avoid ablating the material. Focused or diffused laser beam, laser wavelength and angle of incidence, and other factors, such as roughness of the surface, may affect the suitable laser profile for the charring process. The process stops at the initial charred stage, which increases the surface absorption and emissivity, assuming absorption relationship given by Kirchhoff's law of thermal radiation, while maintaining the base material properties, e.g. conductivity of nickel. Charring in the context of the subject disclosure is performed to change absorption properties of the surface and is not continued to result in a burnt product. It is understood that emissivity concerns radiative (e.g., with a wavelength of several microns) heat transfer, in the wavelengths beyond the visible range (unless at very high temperatures) and the results may not be evaluated based on visual appearance. The ease of implementing a laser charred finish, raster over most any shape surface is especially attractive, along with the permanent nature of the finish.

While the SAOC of the subject technology has many advantages over the existing optical connectors, it needs additional measures to replace the unavailable direct measurement opportunities to verify optical link performance as discussed herein with respect to health check (HC) of the optical links.

Figure 5:
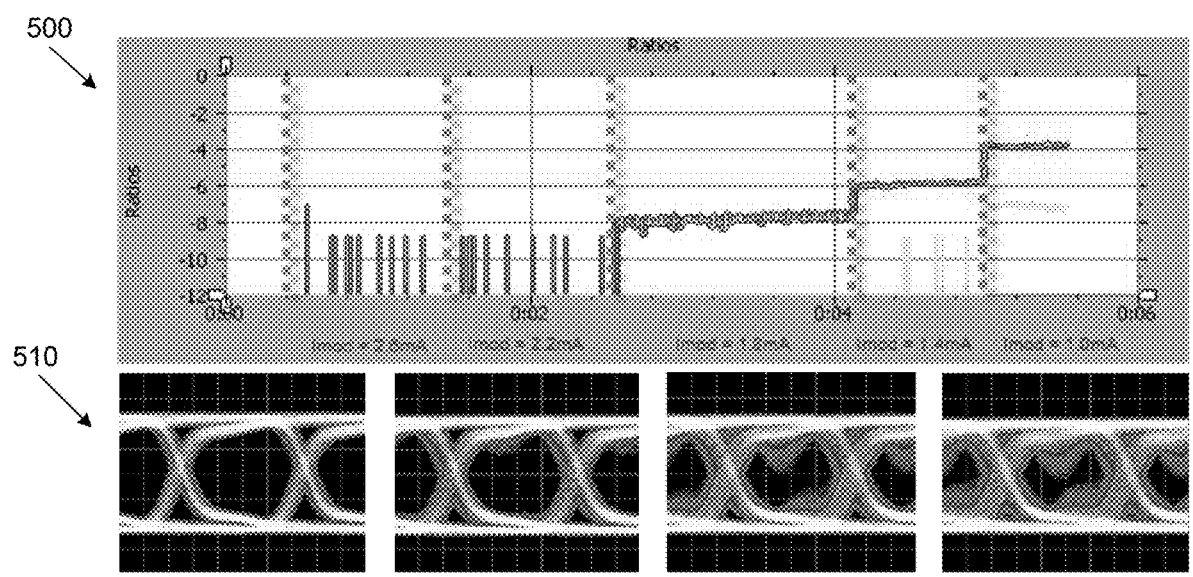
FIG. 5 is a diagram illustrating plots of laser modulation current and corresponding eye diagrams used in performing a health check, according to certain aspects.

FIG. 5 is a diagram illustrating plots of laser modulation currents 500 and corresponding eye diagrams 510 used in performing a health check, according to certain aspects of the subject technology. Existing PCB mounted optical transceivers use optical connectors to exit/enter the housing. This allows direct evaluation of optical link margin at the optical connector, but results in other challenges. An algorithm referred to as SAOC health check (HC) described herein allows optical link performance verification by trending bit error rate (BER) performance of the entire electrical-optical-electrical link in a configuration (e.g., an operating state) designed to yield sensitive (e.g., low margin) optical link performance with strong electrical link performance. It is understood that any test-to-test variation in BER performance in this operating state is directly attributable to a change in optical link performance, which may be used to evaluate the health of optical drive and optical transmission components over the system lifetime. The data shown in plots 500 and 510 are HC proof of concept regarding BER sensitivity. The plots 500 show that laser modulation currents of the VCSELS (e.g., 204 of FIG. 2B) can be adjusted to perform health check, for example, by reducing the laser modulation currents with fixed pre-bias current (e.g., about 0.8 mA) until bit error occurs. The laser modulation current (I mod) values are reduced from about 2.6 mA to about 1 mA. The occurrence of the bit error is indicated by the eye diagrams 510. For example at I mod=1.0 mA, the eye is almost closed, which is an indication of a higher bit error rate.

In some aspects, SAOC telemetry such as receiver signal strength indicator (RSSI) and other performance management algorithms may play roles in implementing the SAOC HC algorithm. Precise and repeatable control of optical performance management parameters enables trending of optical link health and performance throughout integration, test, and product life, even when the SAOC is used in a space vehicle which is on orbit.

The SAOC optical link performance helps to detect hardware defects or issues during integration and testing stage and to understand device failure modes, preserve remaining life, and switch to redundant systems when available. The SAOC HC provides a measure to trend SAOC optical link performance margin using data accessible via electrical interfaces only. An established low consistent drive per end, in a loss sensitive regime, allows performance to be trended through BER and RSSI parameters. The BER is commonly measured in most systems, even on orbit, or can be measured using an external BER tester. The RSSI is related to detector photocurrent at the end of the optical link indicating a measure of optical transmission performance. Precise control of optical configuration is an aspect of the SAOC HC algorithm. It is known and understood that optical component performance will vary with environmental parameters (e.g., temperature). Precision sensing of the environmental parameters along with other factors such as precise and repeatable tuning of the SAOC optical drive and receiving configuration parameters for the current environment can be useful in calibrating the BER performance changes that would otherwise be attributed to these factors.

Knowledge of optical link performance and stability ensures that performance degradation may be detected during integration and testing so that any defective or nonconforming hardware may be screened out. This knowledge is also useful in operational phases of a space program to aid in anomaly analysis and to support system operation and maintenance decisions. The subject SAOC HC defines a repeatable measure of optical link performance in the SAOC configuration using data accessible via electrical interfaces.

Figure 6:
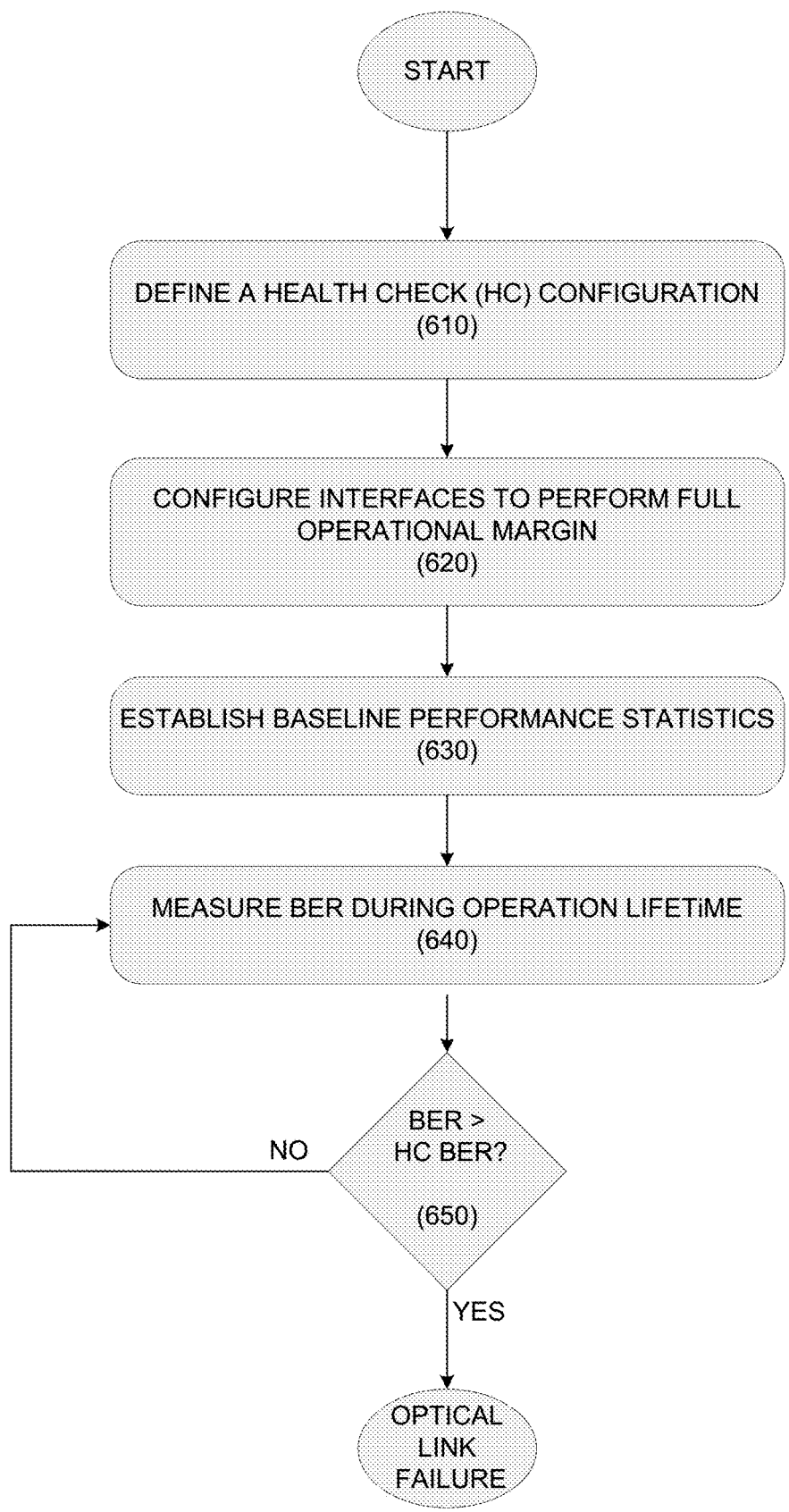
FIG. 6 is a flow diagram illustrating an example of an algorithm for health check (HC) of a SAOC, according to certain aspects.

FIG. 6 is a flow diagram illustrating an example of an algorithm for health check (HC) of a SAOC, according to certain aspects of the subject technology. In some aspects, the HC algorithm can be implemented in firmware and be executed by hardware such one or more processors or controllers, for example, the control circuit 226 of FIG. 2B. The SAOC HC algorithm may be executed at multiple levels of assembly, anywhere that a pseudorandom binary sequence (PRBS) suitable for BER measurements may be generated and checked. In one or more aspects, at operation block 610 a HC configuration is determined. The HC configuration is determined over a planned operational environment (e.g., thermal environment) that results in an optical signal quality below a planned operational level (e.g., VCSEL drive current). The optical signal (e.g., detector photo-current) quality, measured at the receiver, is normally strong enough to avoid adverse threshold effects with an acceptable input impedance ($R_{IN}$) and bandwidth (BW) behavior, while maintaining electrical interface signal integrity margins. The acceptable $R_{IN}$ and BW depends on the system, for example, an acceptable values of $R_{IN}$ can be about 50-100Ω and acceptable values of BW may in the GHz range. In other words, the HC configuration intentionally generates a high optical link BER and low photocurrent at the optical receiver.

At operation block 620, the SAOC electrical interfaces are configured using control signals to perform with full operational margin. For each unit assembled, at operation block 630, BER and photocurrent measurements are taken in the HC configuration to establish baseline performance statistics for the assembly (630). The measurements of BER are performed repeatedly to establish performance statistics for the assembly including the SAOC. Test equipment and/or the flight assembly provide self-synchronizing PRBS patterns to conduct BER testing in the HC configurations. This enables HCs during integration and testing and in flight, as warranted. In one or more aspects, RSSI is also measured and the performance statistics includes an HC-BER and an HC-RSSI statistics for the assembly. At operation block 640, during the operation lifetime of the assembly, BER is evaluated regularly. It is understood that physical degradation or damage to the optical link in an assembly results in a change in BER compared to HC-BER configuration. At control operation block 650, the measured BER is compared to the HC-BER. If the measured BER is not higher than that HC-BER, the assembly is in a stable condition with healthy optical links and the control is passed to the operation block 640. Otherwise, if the measured BER is higher than that HC-BER, an optical link failure is detected.

In one or more aspects, there are a number of approaches to HC configuration definition. For example, a common laser drive condition may be used to yield in family optical BER and photocurrent. Each assembly may be characterized for a particular BER and photocurrent performance. In some aspects, custom laser drive condition is developed for each assembly that yields a common response and each assembly configuration is evaluated to spot outliers. In one or more aspects, the HC configurations are characterized over temperature to account for known optical thermal compensation effects. The HC configuration may be characterized coarsely over temperature, for example, using low, ambient, and high temperatures for expected effects. The HC configuration may be characterized finely with temperature if necessary to allow trending within family. Statistical analysis of assembly level testing and trending yields pass/fail criteria for determining in-family versus degraded assembly performance.

In some aspects, the SAOC optical link signal integrity is purposely compromised in the HC configuration, but in a consistent and predictable manner necessary to obtain meaningful BER measurements and statistics. The SAOC HC algorithm is perceptive to drive, source, coupling, transmission, detector degradation. The SAOC HC is implemented for each assembled serial number to establish baseline performance statistics, and performance is trended over the life of the assembly. The HC configuration may be commanded throughout the life of the unit to check for changes (e.g., degradation) in optical link performance. BER and receiver photocurrent measurements provide perceptivity to optical source changes, fiber/coupling changes or detector degradation, even signal integrity across the electrical interface, for example, when the BER is high but photocurrent has an expected value. The HC approach can increase the confidence that all units are in known-good and stable states throughout and at the completion of system environmental testing and through the operational use of each optical link. The HC algorithm can similarly be beneficial to terrestrial AOCs that also lack an optical connector to interrogate the optical path/performance.

Figure 7:
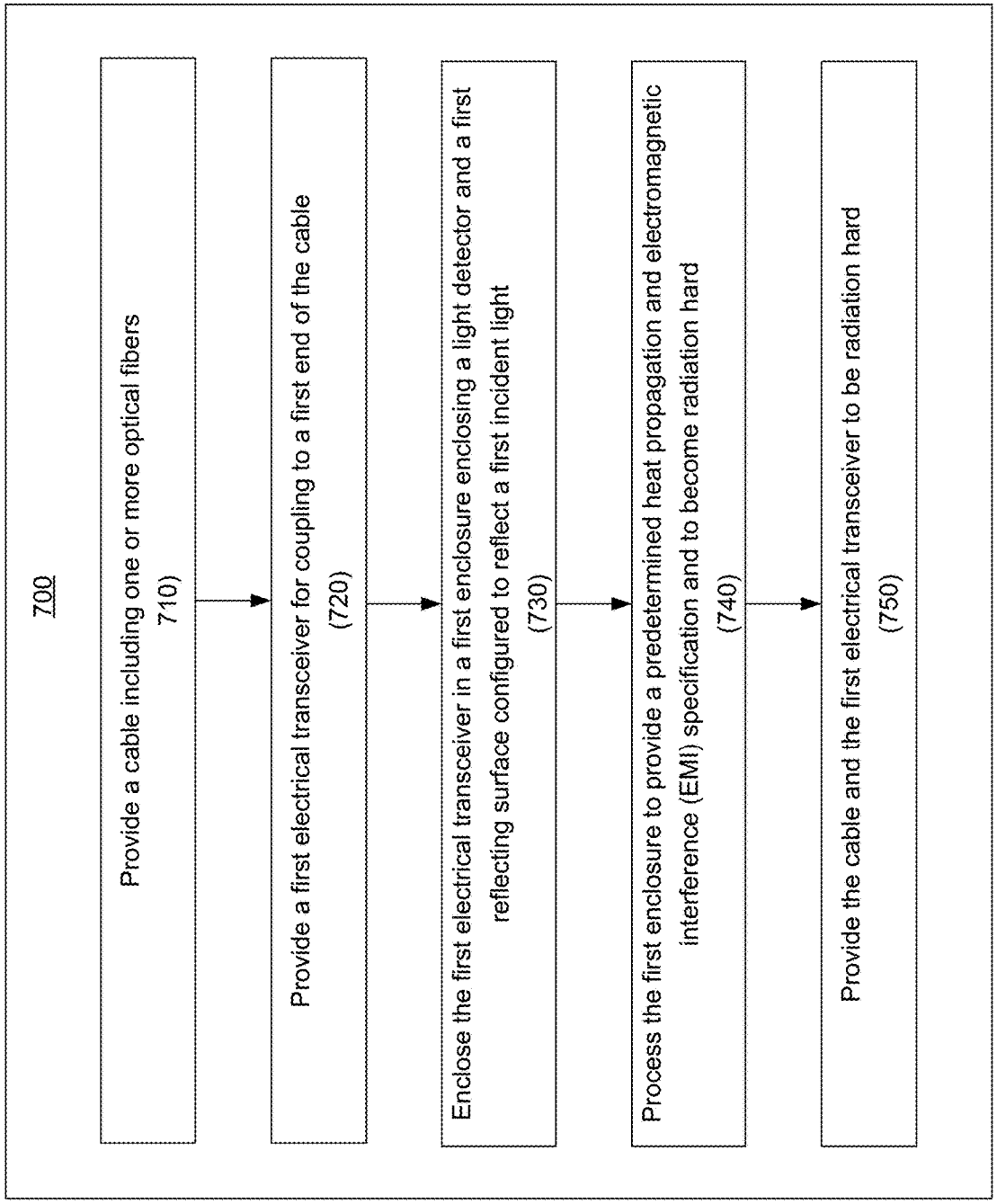
FIG. 7 is a flow diagram illustrating an example of a method for providing a SAOC, according to certain aspects.

FIG. 7 is a flow diagram illustrating an example of a method 700 for providing a SAOC, according to certain aspects of the subject technology. According to the method 700 a cable (e.g., 102 of FIG. 1A) including one or more optical fibers is provided (710). A first electrical transceiver (e.g., 104 of FIG. 1A, or 200 of FIGS. 2A and 2B) for coupling to a first end of the cable is provided (720). The first electrical transceiver is enclosed in a first enclosure (e.g., 230 of FIG. 2B) enclosing a light detector (e.g., 206 of FIG. 2B) and a first reflecting surface (e.g., 218 of FIG. 2B) configured to reflect a first incident light (730). The first enclosure is processed to provide a predetermined heat propagation and electromagnetic interference (EMI) specification and to become radiation hard (740). The cable and the first electrical transceiver are built to be radiation hard (750).

Figure 8:
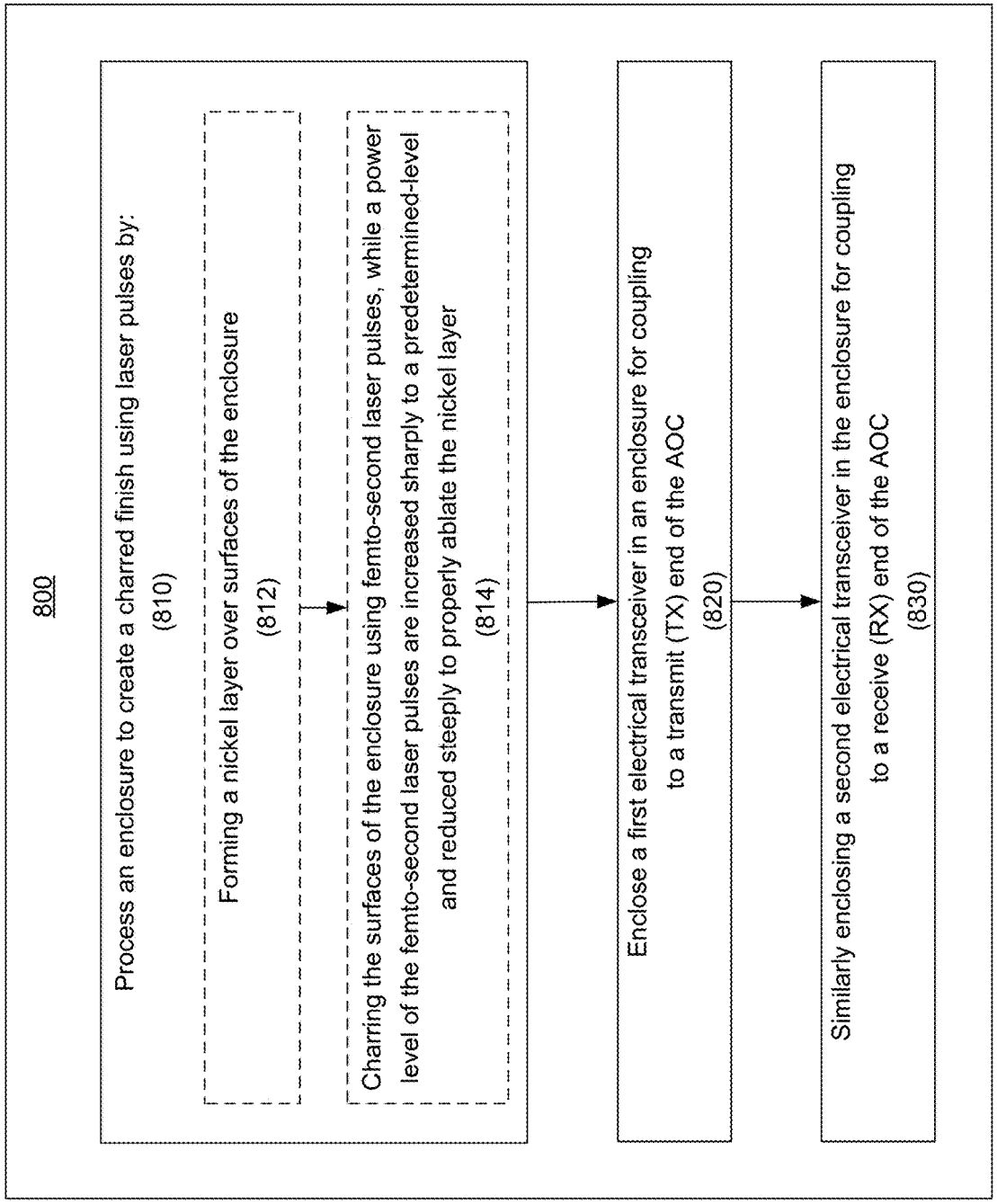
FIG. 8 is a flow diagram illustrating an example of a method for providing an AOC, according to certain aspects, prior to cabling the two transceivers together.

FIG. 8 is a flow diagram illustrating an example of a method 800 for providing an AOC (e.g., 110 of FIG. 1A), according to certain aspects of the subject technology. According to the method 800, an enclosure (e.g., 230 of FIG. 2B) is processed to create a charred finish using laser pulses (810), by forming a nickel layer over surfaces of the enclosure (812) and charring the surfaces of the enclosure (814). The charring is performed by using femto-second laser pulses, while a power level of the femto-second laser pulses are increased sharply to a predetermined-level and reduced steeply (e.g., with profile 400 of FIG. 4) to avoid ablating the nickel layer. The enclosure is used to enclose a first electrical transceiver (e.g., 200 of FIG. 2B) for coupling to an end of the AOC. The first electrical transceiver includes a first optical coupler formed by a first reflector surface (e.g., similar to 218 of FIG. 2B) and a light detector (e.g., 206 of FIG. 2B). A second electrical transceiver for coupling to a opposite end of the AOC is enclosed in the enclosure similarly. The second electrical transceiver includes a second optical coupler formed by a second reflector surface (e.g., 218 of FIG. 2B) and a light source (e.g., 204 of FIG. 2B).

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A space active optical cable (SAOC) comprising:
a cable comprising one or more optical fibers; and
two or more electrical transceivers on opposing ends of the cable and interconnected by the cable, each of the electrical transceivers of the two or more electrical transceivers comprising:
an enclosure enclosing:
one or more light sources, one or more light detectors, and control electronics enclosed in the enclosure;
a coupling medium configured to couple light into and out of the one or more optical fibers;
a radio-frequency (RF) modulator and a local oscillator (LO) modulator configured to modulate light generated by the one or more light sources; and
a light processor coupled to the one or more light sources, the RF modulator and the LO modulator and comprising a filter and lock-diode unit configured to generate a heterodyne output light.

2. The SAOC of claim 1, wherein the two or more electrical transceivers are configured to receive power and communicate signals including data, command, control, and telemetry signals.

3. The SAOC of claim 1, wherein each light source of the one or more light sources is configured to convert a received (RX) electrical signal into light, and wherein each light detector of the one or more light detectors is configured to convert received light into an electrical signal simultaneously with conversion of the RX electrical signal.

4. The SAOC of claim 1, wherein the coupling medium comprises a reflecting surface, wherein each of the one or more electrical transceiver is configured to utilize a shaped reflecting surface to focus light from each light source of the one or more light sources into an optical fiber and simultaneously focus received light from an optical fiber of the one or more optical fibers into a light detector of the one or more light detectors.

5. The SAOC of claim 1, wherein the cable and the one or more electrical transceivers are built using space-rated parts, materials, and processes, wherein the space-rated parts, materials, and processes are quality controlled for vacuum compatibility and reliability.

6. The SAOC of claim 1, wherein the enclosure is processed to have a laser-charred finish using short laser pulses to increase absorption and emissivity, wherein the short laser pulses are configured to produce a charred surface that is thermally conductive.

7. The SAOC of claim 1, wherein the coupling medium comprises a reflecting surface, and wherein the reflecting surface is enhanced by shaping and/or coating with a reflective material to improve optical coupling efficiency and to protect the reflecting surface.

8. The SAOC of claim 1, wherein each of the electrical transceivers provides autonomous management of configuration of electrical and optical components for sustained performance in space environments, mitigating temperature and radiation affects.

9. The SAOC of claim 1, wherein each of the electrical transceivers enables optical performance trending without optical connectors, wherein the optical performance trending is achieved using bit error rate (BER) and receiver signal strength indicator (RSSI) in a sensitive low VCSEL drive regime.

10. The SAOC of claim 9, wherein the optical performance trending during a lifetime of the SAOC is accomplished using electrical interfaces only, in a health check (HC) configuration perceptive to optical losses, wherein the HC configuration is established with a per part optical drive level with acceptable characteristics including output signal strength and bandwidth for nominally repeatable BER and RSSI.

11. The SAOC of claim 1, wherein the enclosure includes heat propagation and electromagnetic interference (EMI) shielding qualified for space application.

12. The SAOC of claim 1, wherein the cable and the two or more electrical transceivers include ionizing radiation resistant components qualified for space application.

13. The SAOC of claim 1, wherein the enclosure includes an electronic circuit including firmware configured to implement autonomous device maintenance and performance management of electrical and optical components for sustained performance in a space environment.

14. A system comprising:
a payload instrument;
a control and communication system;
a SAOC configured to facilitate digital data transfer between the payload instrument and the control and communication system, the SAOC comprising:
a cable including one or more optical fibers; and
two or more electrical transceivers on opposing ends of the cable and interconnected by the cable, each of the electrical transceivers of the two or more electrical transceivers comprising:
an enclosure enclosing:
one or more light sources, one or more light detectors, and control electronics enclosed in the enclosure;
a coupling medium configured to couple light into and out of the one or more optical fibers;
a radio-frequency (RF) modulator and a local oscillator (LO) modulator configured to modulate light generated by the one or more light sources; and
a light processor coupled to the one or more light sources, the RF modulator and the LO modulator and comprising a filter and lock-diode unit configured to generate a heterodyne output light.

15. The system of claim 14, wherein the payload instrument comprises a GPS communication device, an earth sensor and imaging device, or a space sensor and imaging device.

16. The system of claim 14, wherein the two or more electrical transceivers are configured to receive power and communicate signals including data, command, control, and telemetry signals.

17. The system of claim 14, wherein each light source of the one or more light sources is configured to convert a received (RX) electrical signal into light.

18. The system of claim 17, wherein each light detector of the one or more light detectors is configured to convert received light into an electrical signal simultaneously with conversion of the RX electrical signal.

19. The system of claim 14, wherein the coupling medium comprises a reflecting surface, wherein each of the electrical transceivers is configured to utilize a shaped reflecting surface to focus light from each light source of the one or more light sources into an optical fiber and simultaneously focus received light from an optical fiber of the one or more optical fibers into a light detector of the one or more light detectors.

20. The system of claim 14, wherein the cable and the one or more electrical transceivers are built using space-rated parts, materials, and processes, wherein the space-rated parts, materials, and processes are quality controlled for vacuum compatibility and reliability.

* * * * *